Oct. 27, 1925.   1,559,204
J. THOREL
MEANS FOR ORIENTING AUTOMOBILE HEADLAMPS
Filed Feb. 5, 1924
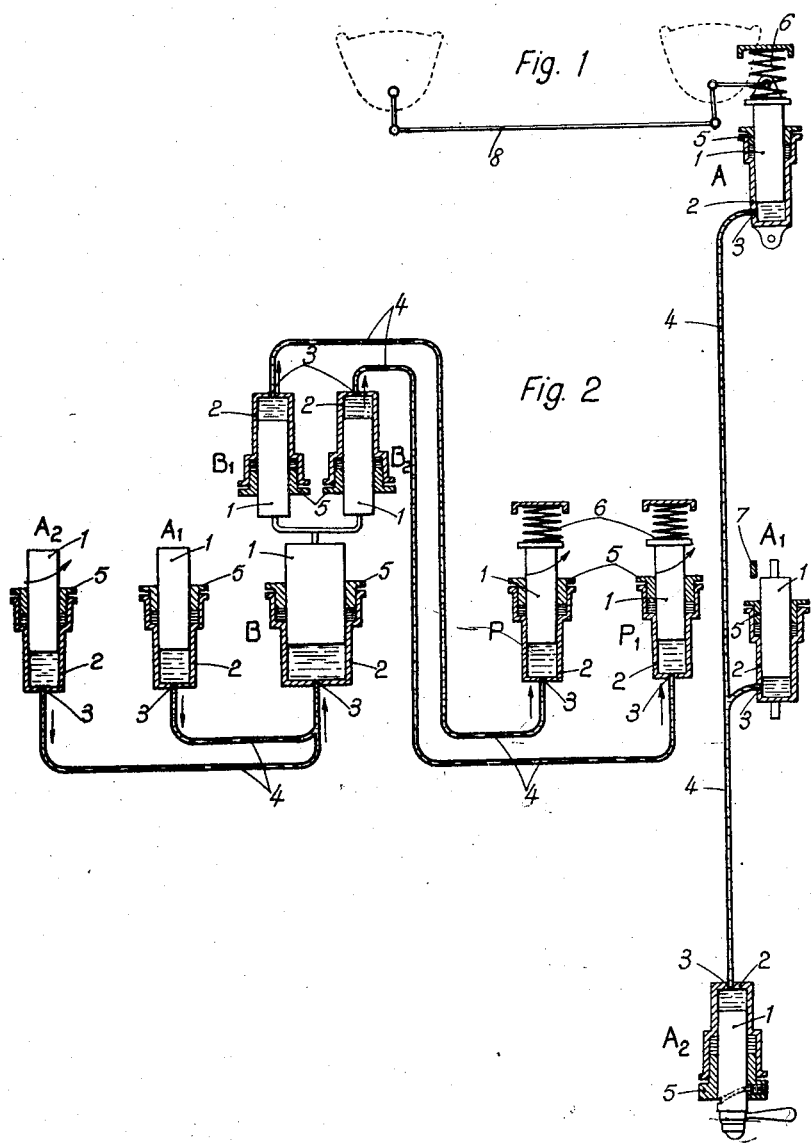

Patented Oct. 27, 1925.

1,559,204

UNITED STATES PATENT OFFICE.

JEAN THOREL, OF LOUVIERS, FRANCE.

MEANS FOR ORIENTING AUTOMOBILE HEADLAMPS.

Application filed February 5, 1924. Serial No. 690,864.

*To all whom it may concern:*

Be it known that I, JEAN THOREL, engineer, a citizen of the French Republic, residing at Louviers, Department of Eure, in France, have invented certain new and useful Improvements in Means for Orienting Automobile Headlamps, of which the following is a specification.

This invention relates to controlling means, more especially applicable for the orientation of automobile headlamps, but also capable of being used in other cases where the conditions of displacement of the parts to be controlled are practically the same or similar.

Figures 1 and 2 of the accompanying drawings shew means in accordance with the present invention, Figure 1 shewing a diagram of the means applied to the orientation of two automobile headlamps and by means of which the principle which characterizes the invention will be readily understood. Figure 2 is a diagram shewing the means for the orientation of two lamps but comprising a modified working thereof.

On referring to Figure 1, it will be seen that the orientation of the lamps is effected by means of an element A comprising a plunger piston 1 which is movable in a cylinder 2, the latter being provided with an outlet 3. The outlet 3 is connected with a constant volume pipe 4 of suitable diameter. The piston works in a stuffing box 5.

The axis of the cylinder and piston may be horizontal or vertical, but the said axis is preferably vertical and the movement of the piston is opposed by a resilient force such as a return spring 6 which is disposed externally of the cylinder, as shewn.

The reversible element thus formed is connected by piping 4 to one element or two or more elements A', A² which are irreversible and which serve to control the movements of the piston A. The entire space of the several elements is filled with a suitable liquid which is preferably oil.

If suitable movements be given to the pistons of the elements A' A² the piston A will evidently have a resultant movement either in the direction of compression of the spring 6 if the volume tends to increase or in the reverse direction if the volume tends to decrease. The spring 6 may act on the piston A in the cylinder 2 either directly or through link work.

If the pistons in the elements A' A² are stationary by reason of the action of the spring 6, the piston 1 and consequently the lamps are also stationary.

The spring 6 ought to be sufficiently powerful to overcome the hydraulic and mechanical friction of the system when the volume of the liquid contained in the cylinder of the element A tends to decrease.

The piston in A' is connected to the steering means 7 for the vehicle and it is immobilized therewith.

The piston in A² is controlled by the chauffeur and the irreversibility is effected, for example, by a screw having a small pitch or by any other known means.

In these conditions any movement of the steering means and consequently of A' will result in a corresponding movement of the piston A and consequently of the headlamps which will be oriented in a suitable direction so as to light the road and especially at curved parts thereof. The chauffeur can always control the element A² so as to rectify this orientation or to give the desired orientation in the case of passing or crossing in front of another vehicle in order to avoid the glare or for any other purpose.

The piston A may be actuated so as to control the headlamp by rod and crank or crank only (the element A being articulated about a suitable axis). It may also, while sliding in its cylinder, turn through a suitable angle and directly control the headlamp if a helical slot be provided having a quick or coarse pitch which may be continuous or interrupted and causes it to turn during its longitudinal displacement or by any equivalent means.

When it is desired to control a plurality of such means, these may be interconnected mechanically by any known means or method such as a coupling bar 8, for example or each means may be controlled by a separate and distinct element as indicated in Figure 2. In this diagrammatic view the elements are connected to the starting elements B' B² of a control of which the supply element B receives the liquid from the elements A' A². The supply element and the starting elements are connected mechanically as indicated in the figure.

The piston A² manipulated by the chauffeur can be controlled by hand or by foot in any suitable manner so that it may be immobilized when the action of the chauffeur ceases or when it becomes convenient.

It is quite evident that with identical piston play the headlamps P, P' can be oriented about a horizontal or any other suitable axis.

The piston plunger could also be replaced by an elastic diaphragm which may be displaced in any suitable chamber.

The use of the aforesaid means with the piston plunger controlled by another piston plunger or two or more piston plungers is not limited to the orientation of automobile headlamps. It could also be used in the control of aeroplanes provided with dual control, for example, where each pilot can, by means of a joy stick, either correct the movements of the pilot or of his assistant or ensure the control alone if one of the joy sticks be locked. A third control element called a compensator could be placed at the disposition of the main pilot in such manner as to completely neutralize the element for the auxiliary pilot in the case of a mistake or in the case of locking of any part or parts of the control gear. The control continues to be effected with the second element once the compensation is effected.

Claims:

1. In an apparatus of the character described, a dirigible head-light, fluid pressure operable means for actuating said head-light, fluid displacing means operable by the vehicle steering gear, manually operable fluid displacing means operable independently of the first displacing means, and a fluid conduit connecting the several fluid displacing means with the fluid pressure operable means.

2. An apparatus as claimed in claim 1 characterized by the provision of means for preventing movement of the fluid displacing means under the influence of fluid.

3. An apparatus as claimed in claim 1 characterized by the provision of means tensioning the movement of the fluid pressure operable means in one direction.

4. An apparatus as claimed in claim 1 characterized by the provision of a spring acting in response to the fluid pressure operable means in one direction, and means for preventing movement of the manually operable fluid displacing means under the influence of fluid pressure acting thereon.

In testimony whereof I affix my signature.

J. THOREL.